(12) United States Patent
Piehler

(10) Patent No.: US 10,809,602 B2
(45) Date of Patent: Oct. 20, 2020

(54) IMAGER AND OPTICAL SYSTEM WITH IMAGER

(71) Applicant: Jabil Optics Germany GmbH, Jena (DE)

(72) Inventor: Eberhard Piehler, Jena (DE)

(73) Assignee: Jabil Optics Germany GmbH, Jena (DE)

( * ) Notice: Subject to any disclaimer, the term of this patent is extended or adjusted under 35 U.S.C. 154(b) by 253 days.

(21) Appl. No.: 15/713,266

(22) Filed: Sep. 22, 2017

(65) Prior Publication Data

US 2018/0088448 A1    Mar. 29, 2018

(30) Foreign Application Priority Data

Sep. 26, 2016   (DE) .................. 10 2016 118 171

(51) Int. Cl.
*G03B 21/00* (2006.01)
*G02B 27/01* (2006.01)
*G02B 27/28* (2006.01)
*G03B 21/20* (2006.01)
*G02B 5/04* (2006.01)

(52) U.S. Cl.
CPC ....... *G03B 21/006* (2013.01); *G02B 27/0172* (2013.01); *G02B 27/283* (2013.01); *G03B 21/2066* (2013.01); *G03B 21/2073* (2013.01); *G02B 5/04* (2013.01)

(58) Field of Classification Search
None
See application file for complete search history.

(56) References Cited

U.S. PATENT DOCUMENTS

| | | | | |
|---|---|---|---|---|
| 5,596,451 A | * | 1/1997 | Handschy | G02B 27/0172 359/633 |
| 5,771,124 A | * | 6/1998 | Kintz | G02B 27/0101 359/630 |
| 5,943,171 A | * | 8/1999 | Budd | G02B 27/0172 359/631 |
| 6,130,784 A | * | 10/2000 | Takahashi | H04N 5/7491 348/E5.145 |
| 6,335,838 B1 | | 1/2002 | Kasai et al. | |
| 2008/0192152 A1 | | 8/2008 | Facius et al. | |
| 2013/0070338 A1 | | 3/2013 | Gupta et al. | |
| 2014/0218648 A1 | * | 8/2014 | Palmer | H04N 13/337 349/15 |

* cited by examiner

*Primary Examiner* — Elmito Breval
(74) *Attorney, Agent, or Firm* — Young Basile Hanlon & MacFarlane, P.C.

(57) ABSTRACT

Described are an imager and an optical system with an imager. The imager includes a beam deflector to deflect light beams within the imager, a light source with an active surface, to emit light beams in the direction of the beam deflector, a reflector with a main plane, to reflect incident light beams from the direction of the beam deflector in the direction of the beam deflector, a light modulator with an active surface, to modulate incident light beams from the direction of the beam deflector and to reflect them in the direction of the beam deflector. The beam deflector is between the reflector and the light modulator. The main plane of the reflector and the active surface of the light modulator enclose an angle of greater than 0° which faces the beam deflector.

14 Claims, 4 Drawing Sheets

IMAGER AND OPTICAL SYSTEM WITH IMAGER

FIELD OF INVENTION

The invention relates to an imager and an optical system with an imager. In particular, the present invention relates to a compact and small-sized imager with high contrast values for the optical system of a mobile near-eye display (NED).

BACKGROUND

NED applications are the focus of current technical developments in many areas of working life and leisure area. In particular, the realization of very compact optical systems with a low weight plays an important role. Particularly in the case of NEDs, which are to be integrated as inconspicuously as possible into the frame of spectacles, it is important to have compact, stable and small-sized optical systems. For image generation, so-called liquid crystal on silicon (LCoS) displays as light modulators are of great interest. It is possible to generate relatively small pixels with an LCoS display and the low amount of light necessary for the NED applications can easily be managed with an LCoS display.

LCoS is a reflective display technology. For this purpose, a plurality of liquid crystal cells are applied to a silicon substrate, the cells being provided with a reflecting surface on their underside. Since an individual driving of the individual cells can take place from below the cells on the silicon substrate, a very high filling factor for an almost pixel-free display with high resolution is achieved in comparison to conventional transmissive displays. A radiation which is incident homogeneously on the light modulator is spatially modulated in accordance with an image information to be displayed. The imager is used for the display and emission of this image information and comprises, in addition to the light modulator, an emission face and an illumination beam path.

There are various approaches to realize compact imagers with an LCoS display, for example by the use of lenses, which are simultaneously used for the illumination of the LCoS display and for projection, or by the multiple use of the glass path of a polarizing beam splitter (PBS) within the illumination of the LCoS display. However, these approaches lead to problems with the maximum achievable contrast (full on—full off), since the existing splitter layers are mostly not ideal and thus light from the illumination path, to be deflected, passes into the imaging channel, which adversely affects the contrast.

It is therefore an object of the present invention to provide an imager and an optical system with an imager which overcome the described disadvantages of the prior art and which in particular enable the realization of a compact and small-sized imager with high contrast values for the optical system of a mobile NED.

SUMMARY

These objects are achieved according to the invention by the independent patent claims. Further embodiments of the invention are contained in the dependent claims.

An imager according to the invention comprises a beam deflector, adapted to deflect light beams within the imager; a light source with an active surface, adapted to emit light beams in the direction of the beam deflector; a reflector with a main plane, adapted to reflect light beams incident from the direction of the beam deflector in the direction of the beam deflector; a light modulator with an active surface, adapted to modulate light beams incident from the direction of the beam deflector and to reflect them in the beam deflector; wherein the beam deflector is arranged between the reflector and the light modulator. The imager is characterized in that the main plane of the reflector and the active surface of the light modulator enclose an angle of greater than 0° facing the beam deflector. The optical system according to the invention comprises an imager according to the invention.

The beam deflector is an optical component which is adapted to be able to deflect light beams (of a propagating light field) passing through the optical component from a first spatial direction in a second spatial direction. A rectilinear transmission of light beams passing directly through the beam deflector is viewed as beam deflection at an angle of 0°. However, at least single light beams of a light field must at least partially be able to experience a beam deflection by an angle of greater than 0° (preferably also greater than 1°, greater than 5° or greater than 10°) through the beam deflector. The deflection can take place, in particular, depending on the propagation direction of the light beams. Preferably, the deflection can be dependent on the polarization of the light field passing through or the light beams. The beam deflector can preferably be a non-polarizing beam splitter or a polarizing beam splitter (PBS). The geometrical progression of the light beams through the imager is referred to as the beam path of the imager.

The light source (LQ) is preferably a luminaire device, which emits a light field (also referred to as illumination light) in the direction of the beam deflector. Particularly preferably, the LQ is a homogeneously emitting surface emitter. The active area of a LQ is the area (surface or volume area) of the LQ formed for the generation and emission of light. The active area of a LQ, in particular of a surface emitter, can be designed in planar or curved fashion. The active surface of an LQ lies within the spatial position of all points of the active area of the LQ that is averaged to a plane. If, for example, the active area of the luminous surface is curved in the case of a surface emitter, the position of the active surface is submitted from a spatially averaged position of all points of the active area of the luminous surface. In the case of a planar surface emitter with a planar luminous layer as the active area, the active surface thus lies in the median plane parallel to the surfaces of the luminous layer centrally within the luminous layer. The light source used can also be a substitute light source generated by a transformation (for example by a compound prabolic concentrator—CPC), which has, in particular, a changed angle emission relative to the real emitter.

The reflector can, for example, be a metallic or dielectric mirror or generally reflective optics, e.g. a back-surface-mirrored lens, or an executed further optical system. The reflector may be planar or curved. In particular, the use of a toric surface or a free-form surface is preferred since this can improve the quality of the illumination. The main plane of a reflector is referred to by the spatial position of all the reflection points of the reflector, which is averaged to a plane, with perpendicular incident of light along the main axis or the optical axis of the reflector. In a planar dielectric mirror, the main plane is parallel and centered within the dielectric layer stack and in the case of a planar metallic mirror, in the area of the surface of the metallic layer. In the case of curved reflectors, averaging takes place over all spatial depth planes of the reflecting area. In particular in the case of a spherically curved mirror, the main plane is therefore arranged parallel to the mirror edge and is arranged in the area between the mirror edge and the center of the mirror.

The light modulator (LM) can preferably be an LCoS display or another digital light modulator (digital light processor—DLP) with an active area (planar or volume area) adapted for the spatial modulation of an incident light field. The active area of a LM may preferably be planar or curved. The active area of a LM lies within the spatial position of all points of the active area of a LM that is averaged to a plane. If, for example, the mirror arrangement is curved as an active area in the case of a DLP based on individual mechanically adjustable micro-mirrors, the position of the active surface is submitted from a spatially averaged position of all points of the individual mirror elements. In a planar LCoS display with a liquid crystal layer as the active area, the active surface thus lies in the median plane parallel to the surfaces of the liquid crystal layer centrally within the liquid crystal layer.

Preferably, the angle formed by the active surface of the light source and the active surface of the light modulator deviates less than ±1°, less than ±5° or less than ±10° from 90°. The angle formed is preferably 90°.

Preferably, the main plane of the reflector and the active surface of the light modulator enclose an angle of greater than 0°, greater than 1°, greater than 5°, greater than 10°, or greater than 30°, facing the beam deflector. Preferably, the enclosed angle is less than 45° or less than 44°.

The idea of the present invention is that by tilting the beam path, which is used for irradiating a light field onto a light modulator, that means of the optical path of the light field, used for the irradiation, between the light source, the reflector and the light modulator, in particular enables the realization of a compact and small-sized imager with high contrast values for the optical system of a mobile NED. If the active surface of the light source and the active surface of the light modulator enclose an angle of preferably less than or greater than 90° which is directed in the beam deflector, a portion of a light field to be deflected by the beam deflector, which has eventually not been completely deflected by the beam deflector, can preferably be emitted in a direction, that does not coincide with the emission direction of the imager according to the invention. In particular, this can lead to a complete suppression or at least to a clear reduction of an image of such direct and unmodulated portions of a light field by downstream projection optical system after the imager according to the invention.

The projection optical system, when imaging of unmodulated portions of the light field, can lead to an increase in the background brightness of a light field, which is apart from that modulated by the light modulator in a display area, and thus lead to a clearly perceptible contrast reduction in the display. In particular, the enclosed angles can be selected in such a way that the light passing through the splitter layer of a PBS as a beam deflector no longer passes through the pupil of a downstream projection optical system and thus no contrast reduction occurs. Furthermore, by tilting a beam path located within the beam deflector (preferably by wedge-shaped splitting of the beam deflector), the portion of radiation of the light source incident directly and unmodulated onto the pupil of a downstream projection optical system can be significantly reduced or completely suppressed with the aid of the total internal reflection (TIR). However, due to the tilting of a part of the beam path located within the beam deflector, it is necessary that for a perpendicular illumination of the light modulator, the main plane of the reflector and the active surface of the light modulator enclose an angle of greater than 0° facing the beam deflector.

The beam deflector preferably comprises a first area with a first surface, wherein the first surface is adapted to deflect (for example reflecting) incident light beams from the direction of the light source in the direction of the reflector and to deflect (for example, to transmit or to deflect only slightly from the original direction) incident light beams from the direction of the reflector in the direction of the light modulator; and a second area with a second surface, wherein the second surface is adapted to deflect (for example, to transmit or deflect only slightly from the original direction) incident light beams from the direction of the reflector in the direction of the light modulator and to deflect (for example, to reflect) light beams from the direction of the light modulator, wherein the first surface and the second surface enclose an angle of greater than 0° facing in the light source and the light modulator. Preferably, this angle is greater than 0.5°, greater than 1°, greater than 5° or greater than 10°. Further preferably, this angle is less than 15°, less than 20° or less than 45°.

Preferably, the first surface and the second surface are spaced apart at a minimum distance greater than 0 mm, greater than 0.1 mm, greater than 0.5 mm, or greater than 1 mm. Preferably, the first surface and the second surface are spaced at a minimum distance of less than 10 cm, less than 5 cm, less than 1 cm, less than 5 mm, or less than 1 mm. The minimum distance here corresponds to the geometric length of the shortest connecting path which results between each point of the first surface and the second surface.

Preferably, the area between the first surface and the second surface comprises a material with a refractive index n3, wherein the refractive index n3 is smaller than the refractive index n1 of a material comprised of the first area. Preferably, the material comprised of the first area can be a flint glass and the material with the refractive index n3 can be a crown glass. Preferably, the material with the refractive index n3 is air. Particularly preferably, the area between the first surface and the second surface comprises two different materials, wherein at least one material has a refractive index n3 smaller than the refractive index n1 of a material comprised of the first area. In particular, the first material can be an air layer which is as thin as possible and directly adjoins the first surface, and the second material has a refractive index which has a refractive index similar to that of a material comprising the first area or the second area. Similarly means, that the refractive indices differ by a maximum of 1%, 5% or 10%. In particular, the second material may also be a material corresponding to a material comprised of the first area or the second area. Preferably, the materials used may be optical glasses (e.g., BK7, SF75). An almost complete filling of a wedge-shaped area between the first surface and the second surface with a material of refractive index n>1 is preferred, because large beam deflections can occur on the first and second surfaces. This enables in particular a telecentric illumination of the light modulator with a 45° prism in transmission.

Preferably, the area between the first surface and the second surface comprises a material with a refractive index n3, wherein the refractive index n3 is smaller than the refractive index n2 of a material comprised of the second area. Preferably, the material comprised of the second area can be a flint glass and the material with the refractive index n3 can be a crown glass. Preferably, an air gap with a small thickness (e.g., less than 0.05 mm) is present between the materials having the refractive index n1 and the refractive index n3.

The first surface is preferably adapted to deflect incident light from the direction of the light source in the direction of the reflector by total internal reflection and/or on a splitter layer. The second surface is preferably adapted to deflect incident light from the direction of the light modulator by total internal reflection and/or on a splitter layer. In particular, beam deflection can take place by means of total internal reflection for incident light on the first and/or second surface under a first angular range and/or beam deflection can take place by reflection on a splitter layer for incident light on the first and/or second surface under a second angular range. The splitter layers can preferably be polarization-dependent splitter layers or splitter layers with a fixed division ratio.

In order to achieve the highest possible contrast, the imager is preferably used telecentrically. This can be made possible in particular by the fact that a splitter layer applied to the second surface is used for polarization-dependent deflection of incident light from the direction of the light modulator.

Preferably, a delay element is arranged between the beam deflector and the reflector. Preferably, a delay element is arranged between the beam deflector and the light modulator. A delay element can in particular be a delay plate (λ/2-waveplate, λ/4 waveplates) or other optical components with polarization-dependent delay characteristics. Preferably, a λ/4-waveplate as a delay element is arranged between the beam deflector and the reflector in the beam path of the imager.

Preferably, the first surface and/or the second surface are adapted to deflect incident light in a polarization-dependent way. A rectilinear transmission of light beams passing directly through the first and/or the second surface is viewed as a beam deflection at an angle of 0° when, for incident light of another polarization, at least a partial beam deflection by an angle of greater than 0° (preferably also greater than 1°, greater than 5° or greater than 10°) can be realized.

A further aspect of the present invention comprises an optical system with an imager according to the invention. In particular, this can be the optical system of a mobile NED, for example in the form of smartglasses.

BRIEF DESCRIPTION OF THE DRAWING(S)

The invention is explained below in exemplary embodiments with reference to the accompanying drawings. In particular:

DETAILED DESCRIPTION OF THE PREFERRED EMBODIMENT(S)

Figure 1:
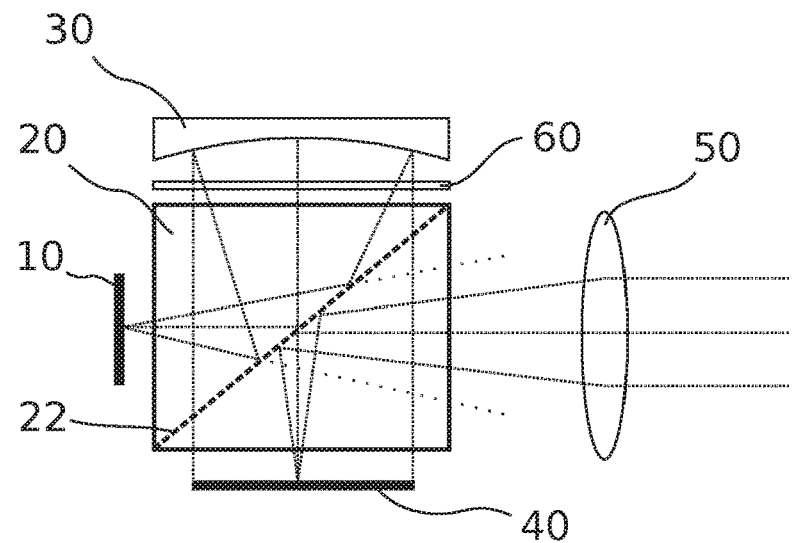
FIG. 1 is a schematic representation of a conventional imager.

FIG. 1 shows a schematic representation of a conventional imager. A light source 10 is located directly at or in the vicinity of a polarizing beam splitter (PBS) as a beam deflector 20. The light emitted by the light source 10 is deflected by 90° through the splitter layer 22 of the beam deflector 20 and, is deflected by a reflective optics as a reflector 30 by a further 180° after passing through the beam deflector 20. In the beam path, a λ/4 waveplate is integrated as a delay element 60 so that the returning light can pass through the beam deflector 20 and can illuminate a light modulator 40, for example an LCoS display. The light modulated by the light modulator 40 and reflected back to the beam deflector 20 is then deflected by the splitter layer 22 of the beam deflector 20 by a further 90° and guided in the direction of a projection optical system 50. The representation is purely schematic and serves exclusively for a graphic illustration. In particular, it is not possible to obtain any angles or distances which are preferred according to the invention.

Such a structure is very compact and has a particularly favorable form factor, since the light source 10 and the projection optical system 50 lie on a common axis, and the structure can thus be optimized or integrated in a spectacle bow. The disadvantage of such a solution is, however, a contrast reduction which arises as a result of the first reflection of the illumination light emitted by the light source 10 in the direction of the beam deflector 20 on the splitter layer 22 of the beam deflector 20 since a certain portion of the light to be reflected always passes the splitter layer 22 of the beam deflector 20 and then, for example, can no longer be eliminated by a cleanup polarizer following the optical beam path.

Figure 2:
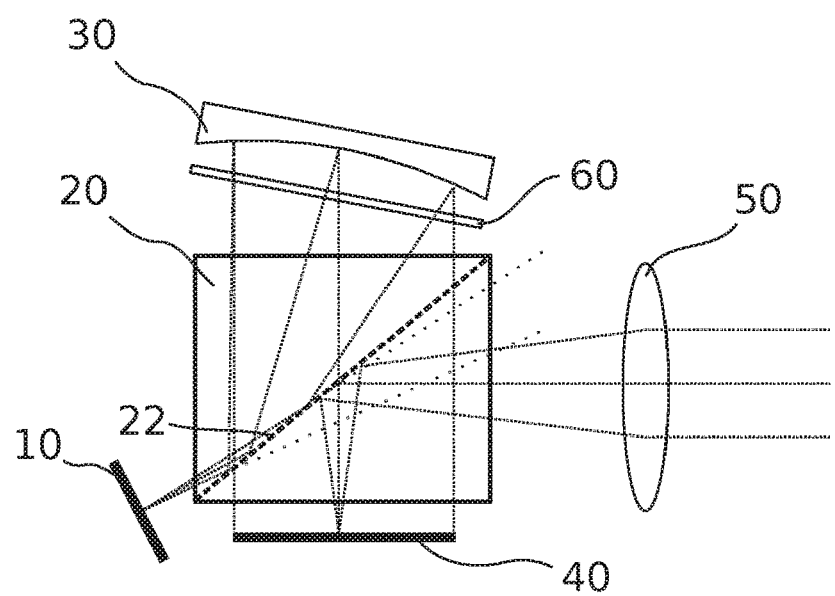
FIG. 2 is a schematic representation of a first embodiment of an imager according to the invention.

FIG. 2 shows a schematic representation of a first embodiment of an imager according to the invention. The representation largely corresponds to the embodiment shown in FIG. 1 of a conventional imager. The individual reference symbols and their assignment apply accordingly. According to the invention, a conventional imager according to the arrangement shown in FIG. 1 is extended in such a way that an active surface of the light source 10, wherein the active surface of the light source 10 is for example arranged parallel to the surface of a planar surface emitter, and the active surface of the light modulator 40, wherein an active surface of the light modulator 40 is for example arranged parallel to the surface of a planar liquid crystal layer of an LCoS display, enclose an angle of less than 90° facing the beam deflector 20; and the main plane of the reflector 30, wherein the main plane of the reflector is for example arranged parallel to the surface of a planar dielectric mirror, and an active surface of the light modulator 40, wherein the active surface of the light modulator 40 is for example arranged parallel to the surface of a planar liquid crystal layer of an LCoS display, enclose an angle of greater than 0° facing the beam deflector. The representation is purely schematic and serves exclusively for a graphic illustration. In particular, it is not possible to obtain any angles or distances which are preferred according to the invention.

The tilting of the light source 10 and the reflector 30 relative to the beam deflector 20 can in this case be selected in particular in such way that the light of the light source 10 passing through the splitter layer 22 of a PBS as a beam deflector 20 no longer passes through the pupil of the projection optical system 50 and thus also does not lead to a contrast reduction in the display of an image information imprinted by the imager to a light field by modulation. The shading at the diaphragm of the projection optical system 50 will act as an angle limiter in the telecentric object space. The beams passing through the splitter layer 22 from the light source 10 are outside the angular range of the beams emitted by the imager according to the invention.

Figure 3:
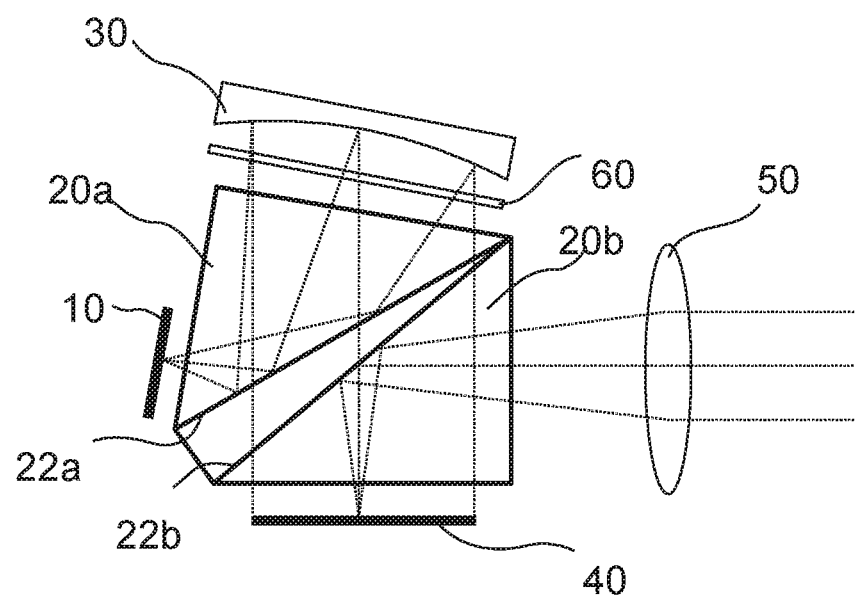
FIG. 3 is a schematic representation of a second embodiment of an imager according to the invention.

FIG. 3 shows a schematic representation of a second embodiment of an imager according to the invention. The representation largely corresponds to the embodiment shown in FIG. 2 of an imager according to the invention. The individual reference symbols and their assignment apply accordingly. In contrast to the representation in FIG. 2, the beam deflector 20 comprises a first area 20*a* with a first surface 22*a*, wherein the first surface 22*a* is adapted to reflect incident light beams from the direction of the light source 10 in the direction of the reflector 30 and to transmit (or deflect only slightly from the original direction) incident light beams from the direction of the reflector 30 in the direction of the light modulator 40; and a second area 20*b* with a second surface 22*b*, wherein the second surface 22*b* is adapted to transmit (or deflect only slightly from the original direction) incident light beams from the direction of the reflector 30 in the direction of the light modulator 40 and to reflect light beams from the direction of the light modulator 40, wherein the first surface 22*a* and the second surface 22*b* enclose an angle of greater than 0° facing the light source 10 and the light modulator 40. The representation is purely schematic and serves exclusively for a graphic illustration. In particular, it is not possible to obtain any angles or distances which are preferred according to the invention.

The splitter layer 22 of the beam deflector 20 from FIG. 2 is thus split into a first surface 22*a* and a second surface 22*b*, resulting in an area between the first surface 22*a* and the second surface 22*b*. This corresponds geometrically to a division of the beam deflector 20 shown in FIG. 2 along the splitter layer 22 with subsequent rotation of the first area 20*a* about an axis of rotation which is defined by the section line (perpendicular to the drawing plane) of the first surface 22*a* with the second surface 22*b*.

The area between the first surface 22*a* and the second surface 22*b* may comprise a material which deviates from a material comprised of the first area 20*a* and/or by the second area 20*b*. Materials comprised of the first area 20*a* may differ from materials comprised of the second area 20*b*. In particular, materials comprised of the area between the first surface 22*a* and the second surface 22*b*, materials comprised of the first area 20*a* and materials comprised of the second area 20*b* may be completely or partly different from one another. In the case of a material comprised between the first surface 22*a* and the second surface 22*b*, it can be air in particular. Preferably, the refractive indices of individual materials differ. Preferably, the first area 20*a* and the second area 20*b* comprise an equal material since strong color defects can occur in the case of different materials.

Figure 4:
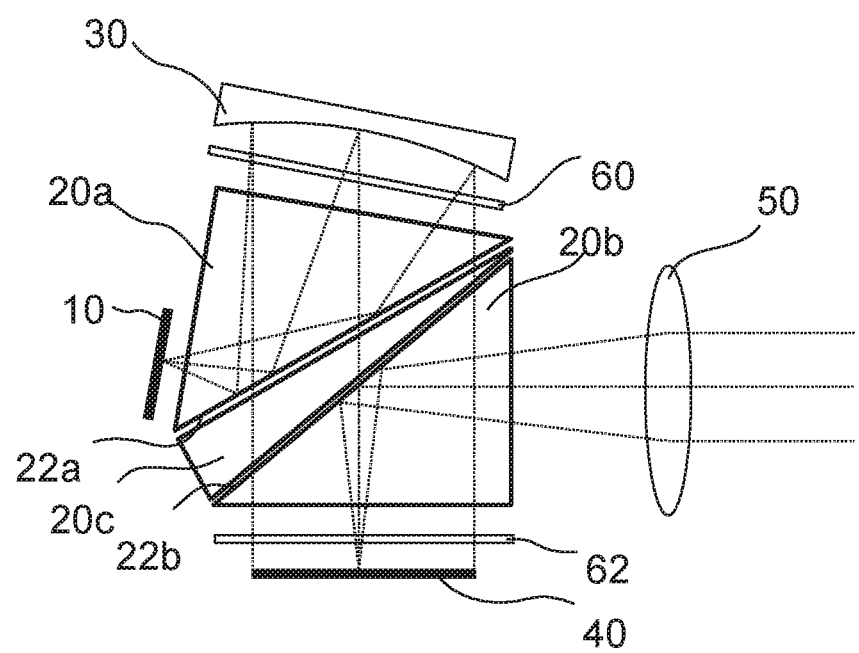
FIG. 4 is a schematic representation of a third embodiment of an imager according to the invention.

FIG. 4 shows a schematic representation of a third embodiment of an imager according to the invention. The representation largely corresponds to the embodiment as shown in FIG. 3 of an imager. The individual reference symbols and their assignment apply accordingly. In contrast to the representation in FIG. 2, the beam deflector 20 as shown in FIG. 3 comprises a first area 20*a* with a first surface 22*a* and a second area 20*b* with a second surface 22*b*. In addition to the rotation (and the angle enclosed thereby between the first surface 22*a* and the second surface 22*b* and facing the light source 10 and the light modulator 40 of greater than 0°), the first surface 22*a* and the second surface 22*b* are spaced with a non-vanishing minimal distance. This distance results here geometrically approximately at a position close to the axis of rotation assumed in FIG. 3. The representation also differently shows a first delay element 60 and a second delay element 62, which are both arranged in the beam path of the imager. The representation is purely schematic and serves exclusively for a graphic illustration. In particular, it is not possible to obtain any angles or distances which are preferred according to the invention.

In this embodiment as well, the area between the first surface 22*a* and the second surface 22*b* can comprise a material which deviates from a material comprised of the first area 20*a* and/or by the second area 20*b*. In particular, the area between the first surface 22*a* and the second surface 22*b* may comprise a wedge 20*c*. A minimal air gap is preferably located on the first surface 22*a* between the first area 20*a* and the wedge 20*c*. The explanations for FIG. 3 apply correspondingly.

Figure 5:
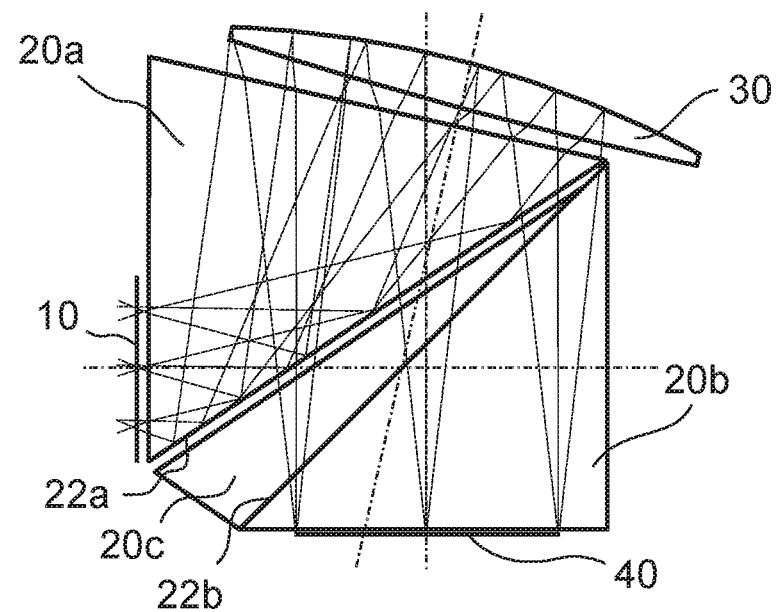
FIG. 5 is a radiation-optical simulation of the optical beam path of a first concrete embodiment of an imager according to the invention.
Figure 6:
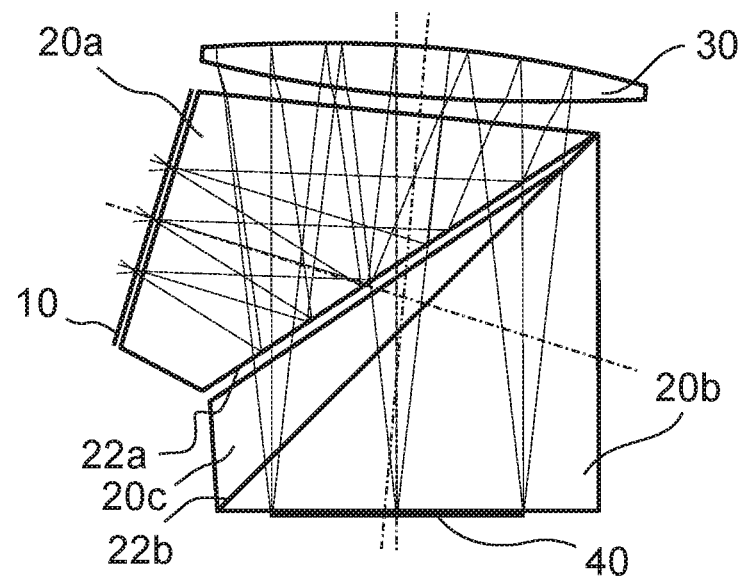
FIG. 6 is a radiation-optical simulation of the optical beam path in a second concrete embodiment of an imager according to the invention.
Figure 7:
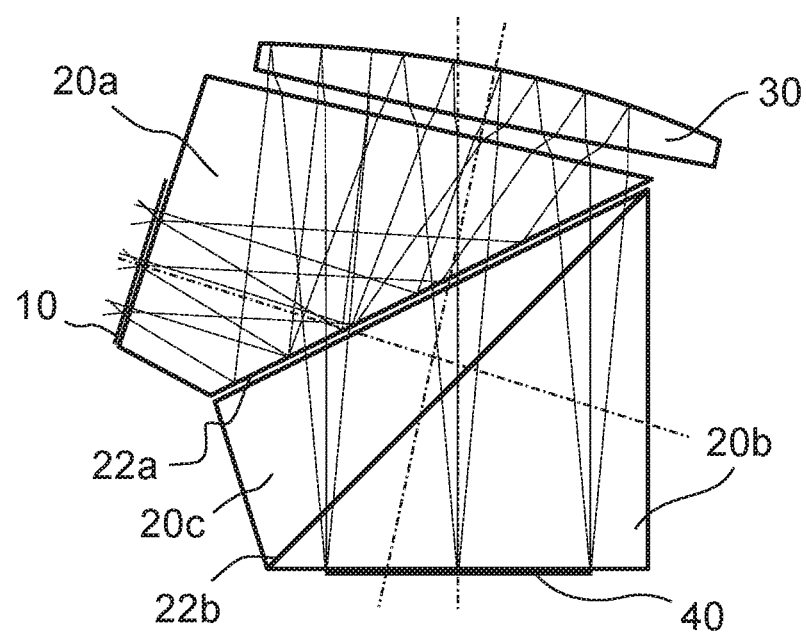
FIG. 7 is a radiation-optical simulation of the optical beam path in a third concrete embodiment of an imager according to the invention.

FIGS. 5 to 7 show different radiation-optical simulations of the optical beam path of concrete, particularly preferred embodiments of imagers according to the invention. In particular, these are imagers according to the invention with a beam deflector 20 which comprises a first area 20*a* with a first surface 22*a* and a second area 20*b* with a second surface 22*b*. The area between the first surface 22*a* and the second surface 22*b* is wedge-shaped in this case. A wedge 20*c* is arranged within the wedge-shaped area. A minimum air gap (n≅1) is located on the first surface 22*a* between the first area 20*a* and the wedge 20*c*.

The first area 20*a*, the second area 20*b* and the wedge 20*c* are assumed to consist of identical materials. These can in particular be optical glasses. The tilting angle of the surface 22*a* results directly from the condition for a preferably telecentric illumination of the light modulator 40 for different materials (glasses). For the radiation-optical simulation of the light path of the beams from the reflector 30 to the light modulator 40, the maximum occurring angle of incidence in the air gap was 75°. The total internal reflection limit of 90° as the maximum angle of incidence is also possible, but a maximum angle of incidence of 75° is preferred on account of losses occurring on a preferred additional antireflection of the first surface 22*a*. The tilting of the reflector 30 has been selected so that all the light of the light source 10 used for the projection is totally reflected at the wedge-shaped air gap. In an alternative embodiment variant, the light is only partially totally reflected there. For the aperture at the light modulator 40, ±10° were used, but larger angular ranges of ±15° or even ±20° are also possible.

FIG. 5 shows a radiation-optical simulation of the optical beam path of a first concrete embodiment of an imager according to the invention. The first area 20*a*, the second area 20*b*, and the wedge 20*c* are each assumed to consist of BK7 (n1=n2=1.52). The maximum angle of incidence at the air gap is 75° (i.e., tilting of the first surface 22*a* with respect to the main plane of the image modulator 40 approximately 33°). The light incident on the beam deflector 20 from the light source 10 is completely totally reflected on the first surface 22*a*, that means at the air gap, completely totally reflected (total internal reflection angle BK7 approx. 41.2°). The active surface of the light source 10 and the active surface of the light modulator 40 enclose an angle of 90°, facing in the beam deflector 20, that is, the plane of the active surface of the light source 10 and the plane of the active surface of the light modulator 40 are perpendicular to each other.

FIG. 6 shows a radiation-optical simulation of the optical beam path in a second concrete embodiment of an imager according to the invention. The representation largely corresponds to the embodiment as shown in FIG. 5 of an imager according to the invention. The individual reference symbols and their assignment apply accordingly. The maximum angle of incidence at the air gap is also 75° (tilting of the first surface 22a relative to the main plane of the image modulator 40 approximately 33°). However, the light incident on the beam deflector 20 from the light source 10 is only partially totally reflected at the air gap. The rest of the incident light is reflected because of its polarization at a splitter layer which is additionally applied (preferably polarization-dependent) to the first surface 22a. The first surface 22a is thus adapted to deflect the incident light from the light source 10 onto the beam deflector 20 over a splitter layer for a first angular range (preferably polarization-dependent) and to deflect it over a total reflection on the first surface 22a for a second angular range. A contrasts increase according to the invention takes place in this case in particular by the fact that an improved deflection of incident radiation takes place. Non-deflected light passing through the air gap (portion of the light which is not totally reflected and which can pass through the splitter layer without deflection) cannot influence a downstream (and not explicitly shown here) projection optical system 50 due to the tilting of the air gap. The active surface of the light source 10 and the active surface of the light modulator 40 enclose an angle of less than 90° facing the beam deflector 20.

FIG. 7 shows a radiation-optical simulation of the optical beam path in a third concrete embodiment of an imager according to the invention. The first area 20a, the second area 20b and the wedge 20c are respectively assumed to consist of SF57 (n1=n2=1.86). The maximum angle of incidence at the air gap is 75° (i.e., tilting of the first surface 22a with respect to the main plane of the image modulator 40 approximately 26°). The incident light on the beam deflector 20 from the light source 10 is reflected on the first surface 22a, that means at the air gap, completely totally reflected (total internal reflection angle SF57 approx. 32.5°). The active surface of the light source 10 and the active surface of the light modulator 40 enclose an angle of less than 90° facing the beam deflector 20.

REFERENCE LIST 10 light source
20 beam deflector
20a first area (of the beam deflector 20)
20b second area (of the beam deflector 20)
20c wedge
22 splitter layer
22a first surface (of the beam deflector 20)
22b second surface (of the beam deflector 20)
30 reflector
40 light modulator
50 projection optical system
60, 62 delaying elements

What is claimed is:

1. An imager comprising:
a beam deflector adapted to deflect light beams within the imager;
a light source with an active surface, adapted to emit light beams in the direction of the beam deflector;
a reflector with a main plane adapted to reflect light beams incident from the direction of the beam deflector in the direction of the beam deflector;
a light modulator with an active surface, adapted to modulate light beams incident from the direction of the beam deflector and to reflect them in the direction of the beam deflector,
wherein the reflector, the beam deflector and the light modulator are arranged in this order along a common axis; and
wherein the reflector is tilted in relation to said common axis so that the active surface of the light modulator and the main plane of the reflector enclose an angle of more than 0°, wherein the light beams emitted by the light source are first deflected by the beam deflector in the direction of the reflector, by which the light beams are reflected back in the direction of the beam deflector, which transmits the light beams to be incident on the light modulator, by which the light beams are modulated and reflected back in the direction of the beam deflector, which finally deflects the modulated light beams out of the imager in a direction facing away from the light source.

2. The imager according to claim 1, wherein the beam deflector comprises:
a first area with a first surface, wherein the first surface is adapted to deflect incident light beams from the direction of the light source in the direction of the reflector and to deflect incident light beams from the direction of the reflector in the direction of the light modulator; and
a second area with a second surface, wherein the second surface is adapted to deflect incident light beams from the direction of the reflector in the direction of the light modulator,
wherein the first surface and the second surface enclose an angle of greater than 0° facing the light source and the light modulator.

3. The imager according to claim 2, wherein the first surface and the second surface are spaced apart by a minimum distance of greater than 0 mm.

4. The imager according to claim 3, wherein the area between the first surface and the second surface comprises a material with a refractive index $n_3$, wherein the refractive index $n_3$ is smaller than the refractive index $n_1$ of a material comprised of the first area.

5. The imager according to claim 4, wherein the area between the first surface and the second surface comprises a material with a refractive index $n_3$, wherein the refractive index $n_3$ is smaller than the refractive index $n_2$ of a material comprised of the second area.

6. The imager according to claim 5, wherein the first surface is adapted to deflect incident light from the direction of the light source in the direction of the reflector by total internal reflection.

7. The imager according to claim 6, wherein the second surface is adapted to deflect incident light from the direction of the light modulator by total internal reflection.

8. The imager according to claim 7, wherein the first surface is adapted to deflect incident light in polarization-dependent way.

9. The imager according to claim 7, wherein the first surface is adapted to deflect incident light from the direction of the light source in the direction of the reflector on a splitter layer.

10. The imager according to claim 7, wherein the second surface is adapted to deflect incident light from the direction of the light modulator on a splitter layer.

11. The imager according to claim 7, wherein the second surface is adapted to deflect incident light in polarization-dependent way.

12. The imager according to claim 1, wherein a delay element is arranged between the beam deflector and the reflector.

13. The imager according to claim 1, wherein a delay element is arranged between the beam deflector and the light modulator.

14. An optical system comprising an imager according to claim 1.

* * * * *